(12) United States Patent
Rodriguez

(10) Patent No.: US 12,157,581 B2
(45) Date of Patent: Dec. 3, 2024

(54) LINING ELEMENT OF AN EDGE OF AN AERONAUTICAL SEAT SHELL, METHOD FOR MANUFACTURING AND METHOD FOR SETTING UP SUCH AN ELEMENT

(71) Applicant: AIRBUS ATLANTIC SAS, Rochefort (FR)

(72) Inventor: Frederic Rodriguez, Croix Chapeau (FR)

(73) Assignee: AIRBUS ATLANTIC SAS, Rochefort (FR)

( * ) Notice: Subject to any disclaimer, the term of this patent is extended or adjusted under 35 U.S.C. 154(b) by 0 days.

(21) Appl. No.: 18/153,743

(22) Filed: Jan. 12, 2023

(65) Prior Publication Data

US 2023/0227178 A1    Jul. 20, 2023

(30) Foreign Application Priority Data

Jan. 13, 2022 (FR) ...................................... 2200242

(51) Int. Cl.
  *B64D 11/00* (2006.01)
  *B64D 11/06* (2006.01)
  *B64F 5/10* (2017.01)

(52) U.S. Cl.
  CPC ................ *B64F 5/10* (2017.01); *B64D 11/06* (2013.01); *Y10T 428/24198* (2015.01)

(58) Field of Classification Search
  None
  See application file for complete search history.

(56) References Cited

U.S. PATENT DOCUMENTS

| | | | |
|---|---|---|---|
| 2,060,656 A * | 11/1936 | Bailey | B60J 10/33 |
| | | | 428/595 |
| 5,643,513 A | 7/1997 | Searle | |
| 2014/0021733 A1 | 1/2014 | Hipshier et al. | |
| 2019/0329684 A1* | 10/2019 | Lombardi | B68G 11/00 |

FOREIGN PATENT DOCUMENTS

| | | |
|---|---|---|
| EP | 2703154 | 10/2018 |
| EP | 3079985 | 10/2018 |

OTHER PUBLICATIONS

French Preliminary Search Report for application No. FR2200242 dated Aug. 24, 2022.

* cited by examiner

*Primary Examiner* — Alexander S Thomas
(74) *Attorney, Agent, or Firm* — Perman & Green, LLP

(57) ABSTRACT

A flexible element for lining an edge of an aeronautical seat shell, made up of an assembly of at least two elongate, flexible and planar cut pieces, secured together by respective longitudinal boundaries so that the assembly has a three-dimensional shape matching with an edge of an aeronautical seat shell.

A method for manufacturing such a lining element, as well as a method for setting up such a lining element over an aeronautical seat shell.

7 Claims, 8 Drawing Sheets

LINING ELEMENT OF AN EDGE OF AN AERONAUTICAL SEAT SHELL, METHOD FOR MANUFACTURING AND METHOD FOR SETTING UP SUCH AN ELEMENT

CROSS-REFERENCE TO RELATED APPLICATIONS

This application is based on and claims priority under 35 U.S.C. § 119 to French Patent Application No. FR2200242, filed on Jan. 13, 2022, in the French Intellectual Property Office, the disclosure of which is incorporated by reference herein in its entirety.

BACKGROUND

Field

The field of the disclosure is that of aeronautical seats, in particular passenger seats, of elements for lining their shells, of methods for manufacturing and setting up such elements.

More specifically, the disclosure relates to an element for lining an edge of an aeronautical seat shell, intended for finishing and stuffing or padding said edge.

Thus, the disclosure finds direct applications in the aeronautical industry, nonetheless it can also be applied to any other related industrial field.

Brief Description of Related Developments

An aeronautical seat shell is a three-dimensional structure with a complex shape, generally made of a plastic, composite or metallic material.

When designing an aeronautical seat including such a shell, the finish of the seat at the edges of the shell is paramount, with regards to the protection of the shell as well as the aesthetic appearance.

Different techniques of elements for lining aeronautical seat shells are known from the prior art, as well as their associated manufacturing methods. Such lining elements are sometimes also called "cap edge".

According to a first known technique, metallic lining elements are obtained by machining in the mass of a metallic material. Although such a technique confers a "high-end" appearance, it has the drawback of a high material and machining cost, and that of a heavy weight. The latter aspect is particularly critical in the aeronautical industry, every possible weight saving being looked for. In addition, such metallic lining elements do not enable coverage of an edge of a shell in one piece, because of the excessively large volume of metallic material that should be machined in the mass. This results in the need for making junctions between several lining elements, and adjusting the lining elements with respect to one another, which represents a major drawback in terms of aesthetics and economic costs during manufacture and mounting.

According to a second known technique, composite lining elements are obtained by molding, for example by injection or by thermoforming. This type of lining elements has the drawback of requiring considerable investments, because of the high economical cost of the molds. In addition, the molds must be renewed for each new shape of lining element to be manufactured.

According to a third known technique, lining elements made of a plastic material, in particular of polyvinyl chloride (PVC), or of silicone, are obtained by extrusion of these materials. Nonetheless, although less expensive, these techniques are barely aesthetic and allow covering only the front portion of the edge of the seat shell, without enabling coverage of the boundaries of the shell contiguous to the edge of the shell. In other words, these techniques enable just the manufacture of lining elements with a simple section, allowing for only a basic finish.

Thus, none of the current systems allows meeting all of the required needs simultaneously, namely providing a technique of light and aesthetically-pleasant lining elements, and which enable coverage of an edge of a seat shell as well as the boundaries of the shell contiguous to the edge, while being inexpensive, with minimum material losses.

SUMMARY

The present disclosure aims to overcome all or part of the above-mentioned drawbacks of the prior art.

To this end, the disclosure relates to a flexible element for lining an edge of an aeronautical seat shell, made up of an assembly of at least two elongate, flexible and planar cut pieces, secured together by respective longitudinal boundaries so that the assembly has a three-dimensional shape matching with an edge of an aeronautical seat shell.

By these arrangements, a lining element made in a simple manner by a limited number of parts/elements can be obtained. An entire edge of an aeronautical seat shell can be covered by only two cut pieces, in a minimum configuration. The flexible nature of the cut pieces allows obtaining a lining element that is itself flexible, which tightly fits to the edge of the aeronautical seat, as well as conferring a pleasant aesthetic and haptic appearance for a user. In addition, the material for obtaining the cut pieces being flexible and planar, the latter can be easily stored, for example in the form of a roll, and the cut pieces themselves, as well as the obtained lining elements, can be stored quite easily thanks to their flexible nature.

To summarize, the features of the lining element according to the disclosure allow obtaining a light and aesthetically-pleasant lining element, entirely covering the edge of the seat shell as well as at least one boundary of the shell contiguous to the edge, while being inexpensive to manufacture, thanks to its simple design.

The disclosure also encompasses the following complementary preferred embodiments, which can be freely combined according to any technically-feasible combination.

More particularly, according to a preferred embodiment, said three-dimensional shape corresponds to the shape generated by the translation of a cross-section of the lining element along an open path of the three-dimensional space, said open path corresponding to the path covered by an edge of an aeronautical seat shell.

Thus, a lining element tightly fitting to the seat edge is obtained. Thus, it is possible to set up the lining element over the edge with a very small clearance, thereby contributing to the effective protection of the edge, and improving the aesthetic and haptic appearance even further. In addition, in such a configuration, the lining element has the advantage of being continuous along the edge, which reinforces its strength over the edge, and improves the aesthetic appearance even further.

According to a preferred embodiment, the lining element is made up of three cut pieces, the lining element having a substantially U-like shaped cross-section.

In this manner, the edge as well as the two boundaries of the shell contiguous to the edge are covered by the lining element. Thus, the protection and the aesthetic appearance of the seat shell are reinforced and improved even further.

According to a preferred embodiment, the cut pieces are secured together by sewing, welding, or gluing.

According to a preferred embodiment, the cut pieces are made up of a lamination of several planar flexible materials.

Thus, it is possible to combine materials having different mechanical and aesthetic properties. Thus, it is possible to obtain a lining element suited to different uses and to different ranges of seats.

According to a preferred embodiment, the cut pieces comprise a woven material, and/or leather, and/or leatherette.

Such materials correspond to flexible and planar materials which can be easily cut and assembled, and which have mechanical and aesthetic characteristics that are looked for in the aeronautical industry in particular.

According to a preferred embodiment, at least one cut piece comprises an elongate reinforcement fastened on an inner surface of said cut piece.

Thus, it is possible to reinforce the lining element while preserving its external appearance. A greater longevity of the lining element, and thus of the seat, is obtained.

Another object of the disclosure is an aeronautical seat shell comprising a lining element, said lining element being fastened over an edge of the aeronautical seat shell.

Another object of the disclosure is a method for manufacturing a lining element, comprising:

a step of flat cutting a flexible and planar material, so as to obtain said elongate cut pieces, a step of assembling said cut pieces together by respective longitudinal boundaries.

Thus, the lining element according to the disclosure can be obtained through a limited number of steps. In addition, said steps have the advantage of being particularly technically simple, and can be made quickly and do not need the intervention of a trained operator.

To summarize, the method allows obtaining a lining element having the advantages mentioned so far, while having the advantage of being itself simple and inexpensive.

According to a preferred embodiment, the method further comprises a step of forming a hem, formed over at least one longitudinal boundary of at least one cut piece, said step preceding the assembly step.

Thus, fraying of the longitudinal boundaries of the cut piece can be avoided, and a better aesthetic appearance is obtained.

According to a preferred embodiment, the method further comprises a reinforcement step in which a reinforcement is fastened over an inner surface of a cut piece, said step preceding the assembly step.

Another object of the disclosure is a method for setting up a lining element over an aeronautical seat shell, comprising:

a preparation step, in which a bonding means is applied over the boundaries contiguous to the edge of the shell, a set-up step, in which the lining element is set up over the edge.

According to a preferred embodiment, the method further comprises a step of setting up a foam over the edge of the shell, said step preceding the set-up step.

BRIEF DESCRIPTION OF THE FIGURES

Other advantages, aims and particular features of the present disclosure will appear from the following non-limiting description of at least one particular embodiment of the devices and methods objects of the present disclosure, with reference to the appended drawings, wherein.

DETAILED DESCRIPTION

This description is given on a non-limiting basis, each feature of an embodiment may advantageously be combined with any other feature of any other embodiment.

It should be noted, as of now, that the figures are not to scale.

Example of a Particular Embodiment

Figure 1:
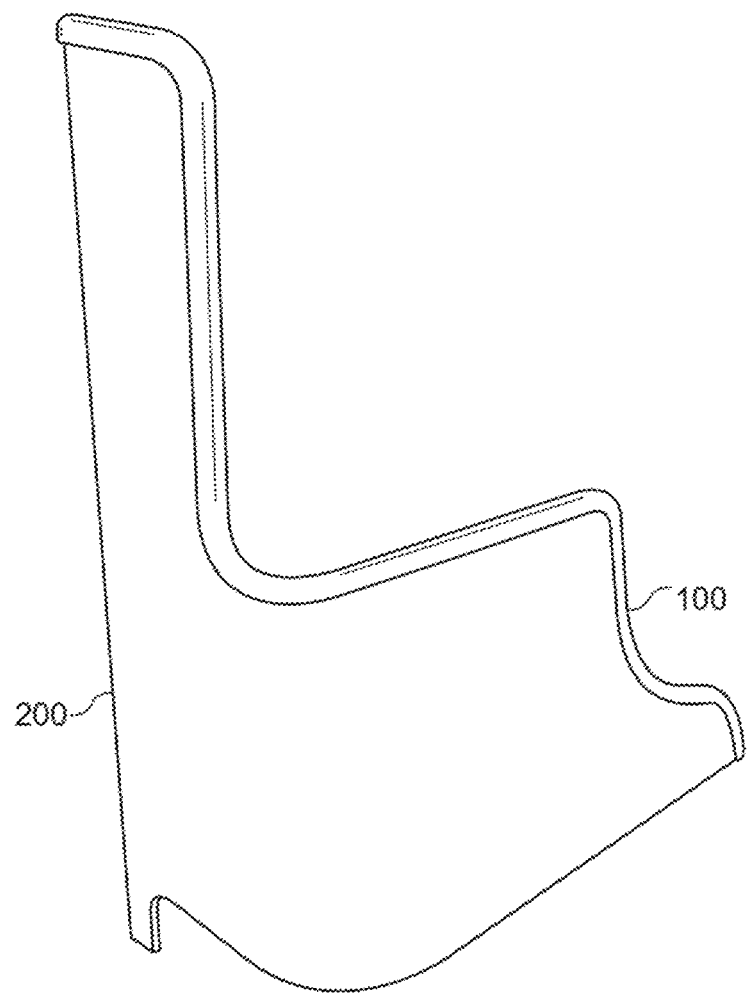
FIG. 1 is a particular embodiment of the element for lining an edge of an aeronautical seat shell.

FIG. 1 represents an element 100 for lining an edge of an aeronautical seat shell 200 according to a particular embodiment of the disclosure.

The lining element 100 matches with the shape of the edge so as to be able to cover it. By "matching with", it should be understood the fact that the lining element is adapted or configured to tightly cover, i.e. with a small clearance, an edge of an aeronautical seat. Thus, when it is disposed over the edge, the lining element 100 allows finishing the edge and consequently the seat shell 200. It should also be understood that a lining element 100 is designed specifically to cover a particular shell 200, the shapes of the shells 200 can vary.

Figure 2:
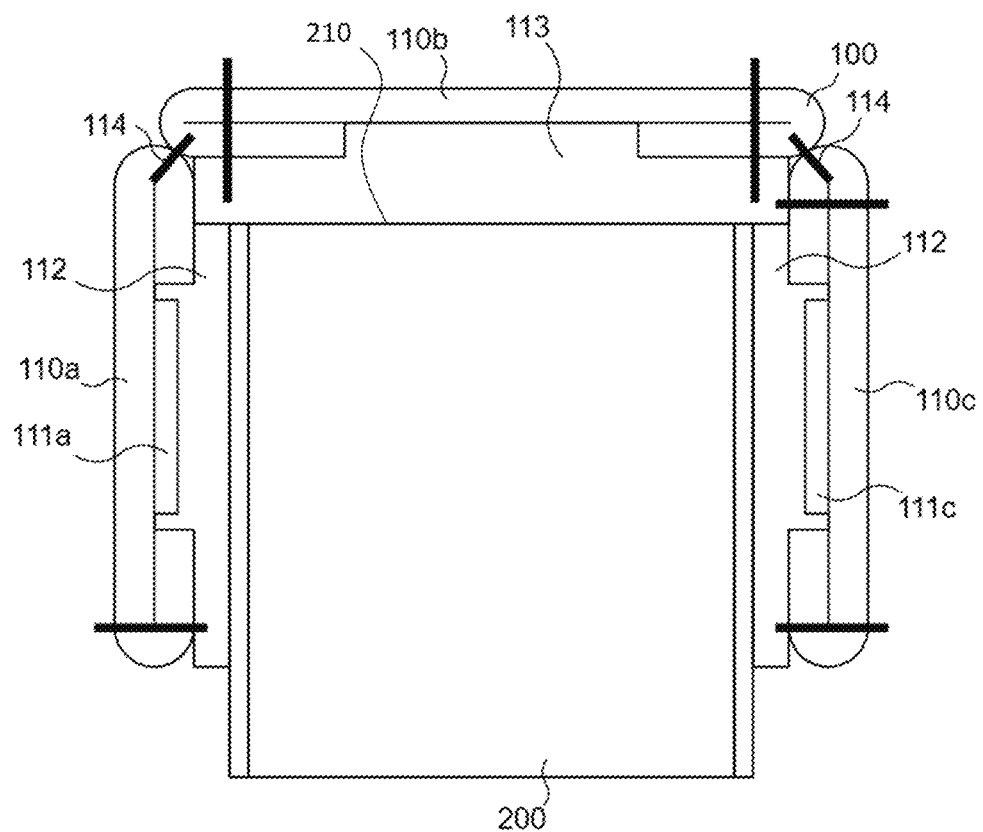
FIG. 2 is a sectional front view of the lining element disposed opposite an edge of an aeronautical seat shell according to a particular embodiment.
Figure 3:
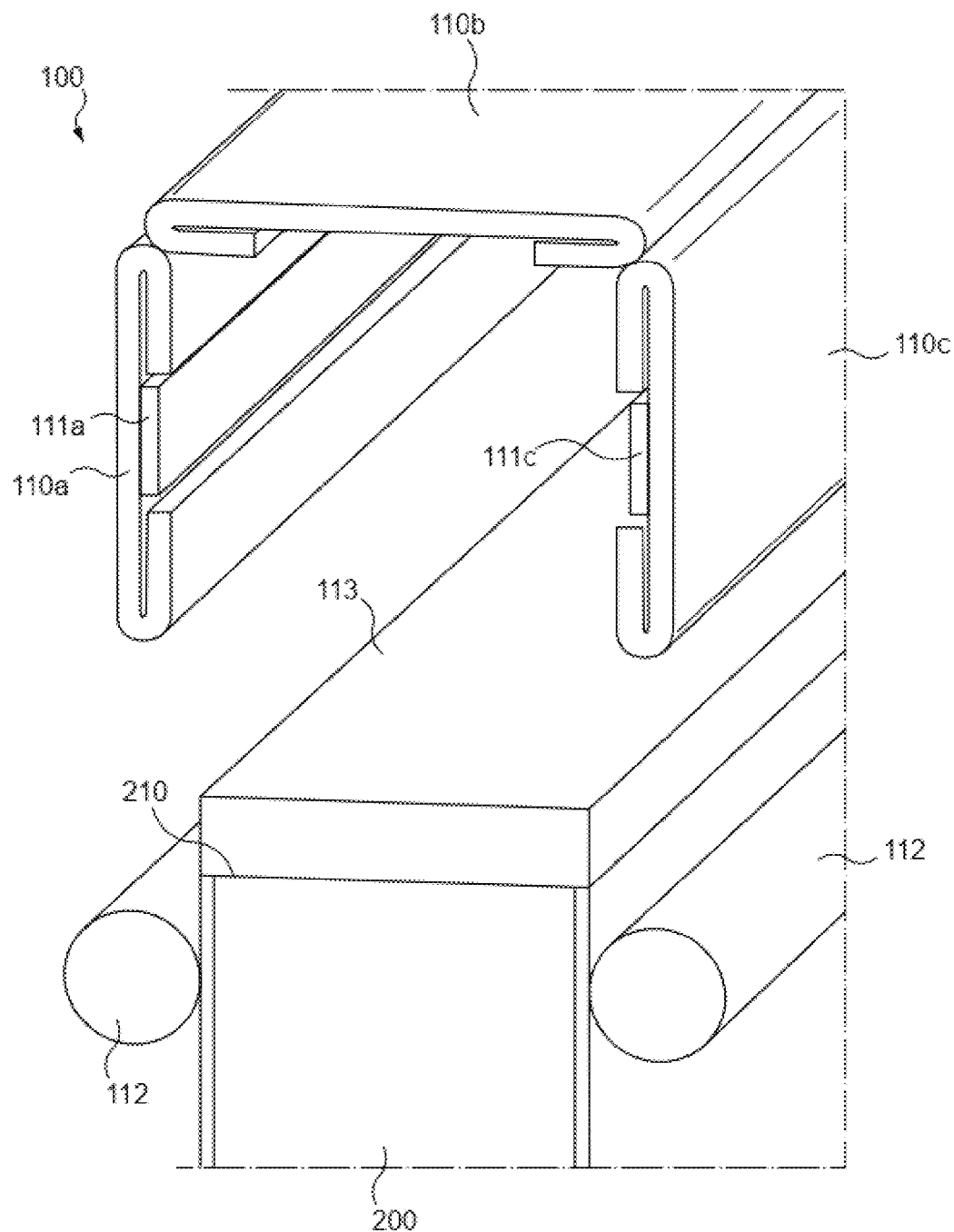
FIG. 3 is a sectional perspective view of the lining element disposed opposite an edge of an aeronautical seat shell according to a particular embodiment.

FIGS. 2 and 3 represent a sectional view of the lining element 100 disposed opposite an edge 210 of an aeronautical seat shell 200 according to a particular embodiment of the disclosure, respectively in front view and in perspective view. In addition, in FIG. 3, the lining element 100 is represented opposite the edge of the shell 200, yet without being disposed over the edge.

The lining element 100 includes three elongate cut pieces 110*a*, 110*b* and 110*c*. The cut pieces 110*a*, 110*b* and 110*c* are obtained from a flexible and planar material, such as leather, leatherette or a woven material, supplied in the form of a drape, a sheet, a film, etc. A cut piece may also be made from several cut sub-pieces, made of different materials or not, for example secured together. The cut pieces 110*a*, 110*b* and 110*c* may also be made each of a different material. The cut pieces 110*a*, 110*b* and 110*c* may also be obtained from a lamination of several flexible materials. Preferably, the selected material is a material that is particularly abrasion-resistant, and/or fire-resistant.

The three cut pieces 110*a*, 110*b* and 110*c* are assembled together, the assembly of the three cut pieces 110*a*, 110*b* and 110*c* forming the bulk of the lining element 100. In the non-limiting example represented in FIGS. 2 and 3, the three cut pieces 110*a*, 110*b* and 110*c* are assembled together substantially perpendicularly, any other angle may nonetheless be delimited between two cut pieces. A longitudinal boundary of a cut piece 110a, 110b or 110c is secured at most to one other longitudinal boundary of a cut piece 110a, 110b or 110c. In other words, the cut pieces 110a, 110b and 110c are assembled one after another along their longitudinal boundaries. In the present embodiment, the cut piece 110b corresponds to a central cut piece able to cover the edge 210, and the cut pieces 110a and 110c correspond to lateral cut pieces disposed on either side of the central cut piece 110b, and are able to cover the boundaries contiguous to the edge 210.

The aforementioned assembly confers a cross-sectional shape of the lining element 100 corresponding substantially to a U-like shape (inverted in FIGS. 2 and 3), more or less flared, when the lining element 100 is made up essentially of three cut pieces.

It should be easily understood that when the lining element 100 includes two cut pieces, the shape of the cross-section corresponds substantially to that of a V-like shape, more particularly of a L-like shape when the cut pieces are assembled perpendicularly.

In the same manner, the lining element 100 may include more than three cut pieces, such as four cut pieces, the shape of the cross-section then corresponding substantially to that of a W-like shape or of a M-like shape, for example.

Figure 4:
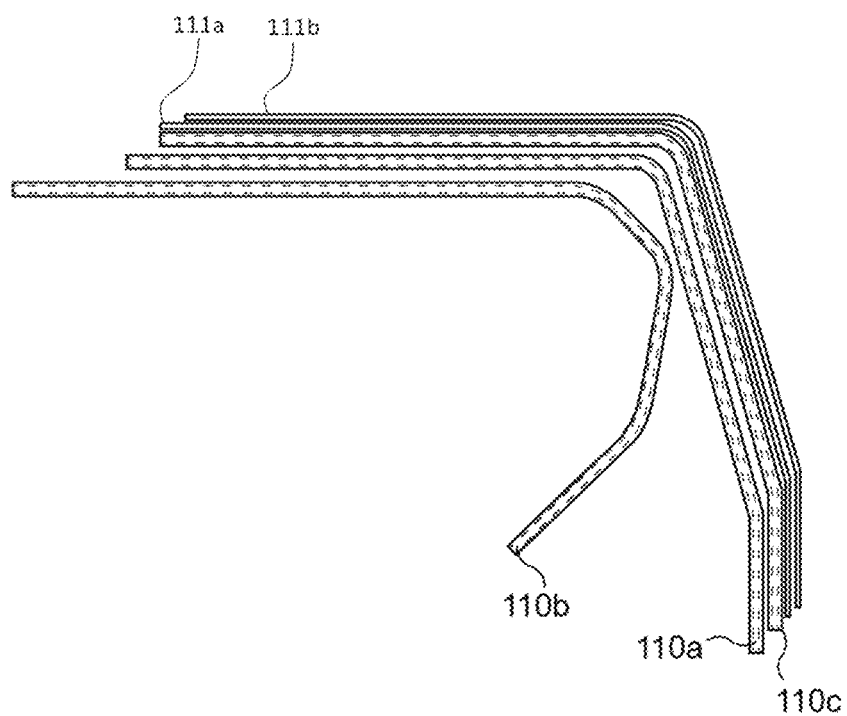
FIG. 4 is a set of cut pieces in a disassembled state.

FIG. 4 represents a set of cut pieces, comprising in particular the three cut pieces 110a, 110b and 110c in a disassembled state. The cut pieces 110a, 110b and 110c are in the form of curvilinear strips, i.e. they are in the form of strips of a planar matter extending substantially in a plane according to a curvilinear pattern in this same plane. In the present embodiment, the lateral cut pieces 110a and 110c have substantially the same shape.

On the example of FIG. 4, the cut pieces 110a, 110b and 110c follow a J-like and L-like shaped curvilinear pattern, nonetheless other patterns may be followed, such as a S-like, U-like, C-like shaped pattern, etc.

The cut pieces 110a, 110b and 110c are assembled by sewing in the present embodiment. Other assembly techniques may also be used, such as gluing or welding, for example.

Preferably, the cut pieces 110a, 110b and 110c are sewn together at the longitudinal boundaries by seams 114. A seam 114 may be simple or double depending on the desired robustness, the material of the cut pieces, etc.

By longitudinal boundary, it should be understood the boundary of a cut piece extending parallel to the path followed by the lining element 100. In general, the longitudinal boundaries are the longest boundaries of a cut piece.

Advantageously, the seam 114 between two cut pieces is made at a distance from the longitudinal boundary, so as to be able to form a finishing hem with the excess matter at the longitudinal boundary. The obtained hem, as represented in FIGS. 2, prevents fraying of the longitudinal boundaries of the cut piece, and confers a better aesthetic appearance.

Figure 5:
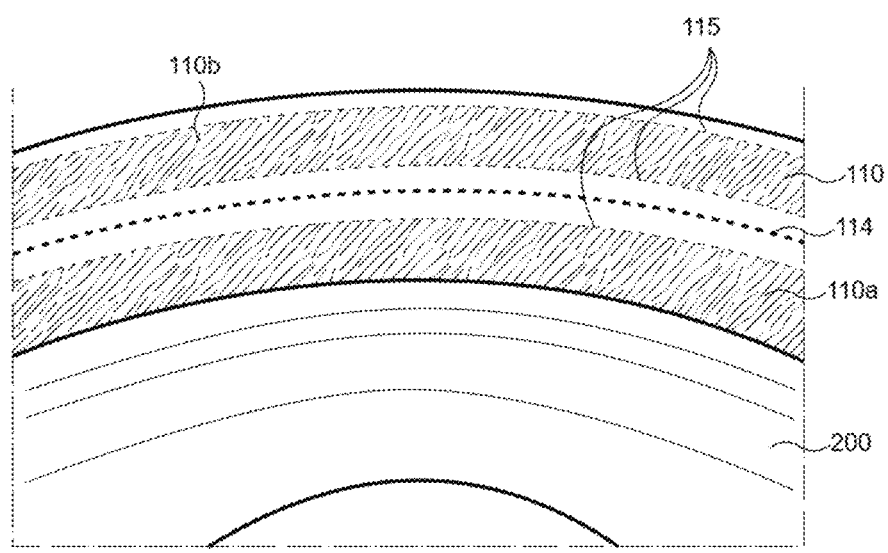
FIG. 5 is a detailed view of an example of a result obtained after sewing the cut pieces together.

FIG. 5 represents a detailed view of an example of a result obtained after sewing the cut pieces 110a, 110b and 110c together, and forming the hems. The seams 114 are barely visible, whereas seams 115 allowing forming the hems are visible and contribute to the aesthetically-pleasant appearance of the lining element 100.

Figure 6:
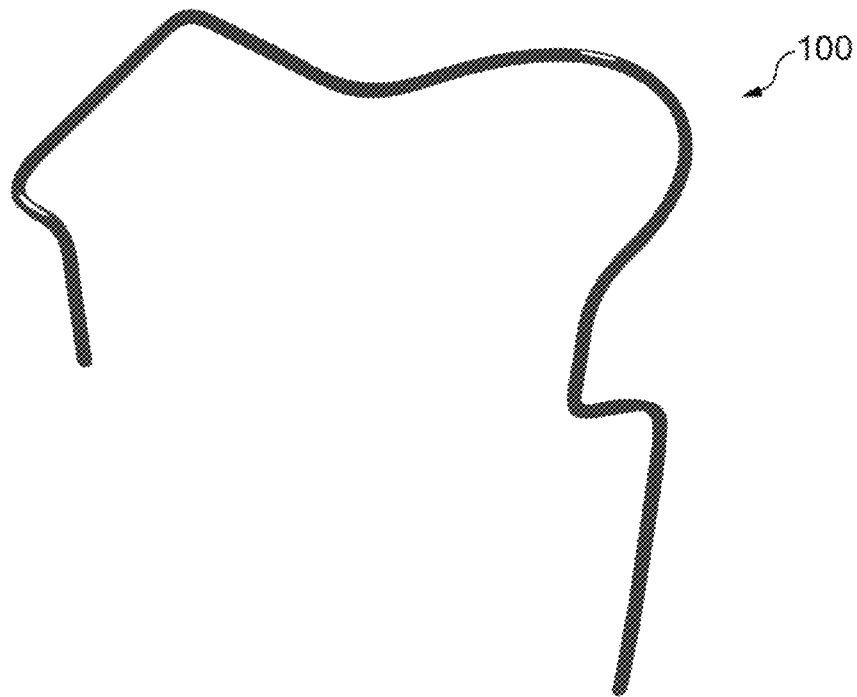
FIG. 6 is a perspective view of the lining element, having a three-dimensional curvilinear shape.

By assembly of the cut pieces 110a, 110b and 110c, the lining element 100 acquires a three-dimensional curvilinear shape, as represented by the lining element 100 example of FIG. 6. More particularly, the shape of the lining element 100 corresponds substantially to the shape obtained by translation of the cross-section (U-like shaped in the present embodiment) along an open path in the three-dimensional space, said path having the same curvature as an outer surface of the edge 210 of the shell 200 at every point. More specifically, this path corresponds to the path followed by the edge 210 of the aeronautical seat shell 200. Thus, the lining element 100 can be disposed over the edge 210 so as to cover the latter, the lining element 100 matching with the shape of the edge 210.

It should be pointed out that the cross-section may be variable along the open path of the space, i.e. the three-dimensional curvilinear shape may have a variable cross-section. In other words, this means that the width of the cut pieces 110a, 110b and 110c, and in particular of the cut piece 110b, is variable. Thus, it is possible to adapt to a seat shell that would have a non-constant thickness.

Such a three-dimensional and curvilinear shape of the lining element 100 is obtained through the selection of the particular shape of each of the cut pieces 110a, 110b and 110c. Thus, a set of cut pieces corresponds to each edge 210 of the shell, including at least two cut pieces that are initially planar, with different shapes, allowing obtaining a three-dimensional assembly.

Optionally, as represented in FIGS. 2 and 3, the lateral cut pieces 110a and 110c include reinforcements 111a and 111c. The reinforcements 111a and 111c are disposed over an inner surface of the cut pieces 110a and 110c. The inner surface of said cut pieces corresponds to the surface oriented towards the edge 210 and its contiguous boundaries. In other words, the inner surface is the surface oriented opposite to an outer surface which is visible when the lining element 100 is disposed over the aeronautical seat shell 200.

Like the cut pieces 110a, 110b and 110c, the reinforcements 111a and 111c are in the form of planar curvilinear strips, in a disassembled state, as represented in FIG. 4.

Preferably, the reinforcements 111a and 111c are made of a stiffening material, yet still remaining flexible enough to enable assembly of the cut pieces together. For example, such a material may be a laminate, for example, by ISO-VOLTA™, which produces various laminated materials. An equivalent, such as a thermoplastic film, may also be used. Preferably, the thickness of the used material is equal to substantially 0.5 millimeters.

The reinforcements 111a and 111c may be fastened on the inner surfaces of the cut pieces 110a and 110c by means of any suitable technique, and preferably by gluing. Gluing may be performed by depositing glue, or by setting up a "double-sided" type adhesive tape, i.e. having a bonding side on each of its faces.

The lining element 100 can be fastened over the shell 200 by means of any suitable technique. Preferably, the lining element 100 is glued over the shell 200. More specifically, the inner surfaces of the cut pieces 110a and 110c are glued to the boundaries contiguous to the edge 210, as represented in FIG. 3, in which glue beads 112 are represented. In FIG. 2, the glue 112 is distributed over the inner surface of the cut pieces 110a and 110c, so as to ensure a firm hold of the lining element 100 on the shell 200. Alternatively, a double-sided type adhesive strip may also be used.

Advantageously, a layer of foam 113 is disposed between the edge 210 and the central cut piece 110b. Optionally, the foam layer 113 is glued on the edge 210 and/or the inner surface of the central cut piece 110b. Preferably, the used glue is water-based glue.

The lining element 100 is obtained by a manufacturing method 300 which is described hereinafter, illustrated by the flowchart of FIG. 7.

During a flat cutting step 310, the cut pieces 110a, 110b and 110c are obtained by flat cutting a flexible and planar, or flattened, material, such as a drape of a flexible material or a sheet of a flexible material.

Of course, the cut piece may be optimized so as to minimize unusable material scraps, for example by using cutting optimization software during the phase of programming a cutting controller.

Optionally, during a step 320 of forming a hem, a hem is formed over the longitudinal boundary of a cut piece, in accordance with what has been disclosed so far.

Optionally, during a reinforcement step 330, a reinforcement is fastened on an inner surface of a cut piece. For example, fastening of the reinforcement may be done by gluing.

Figure 7:
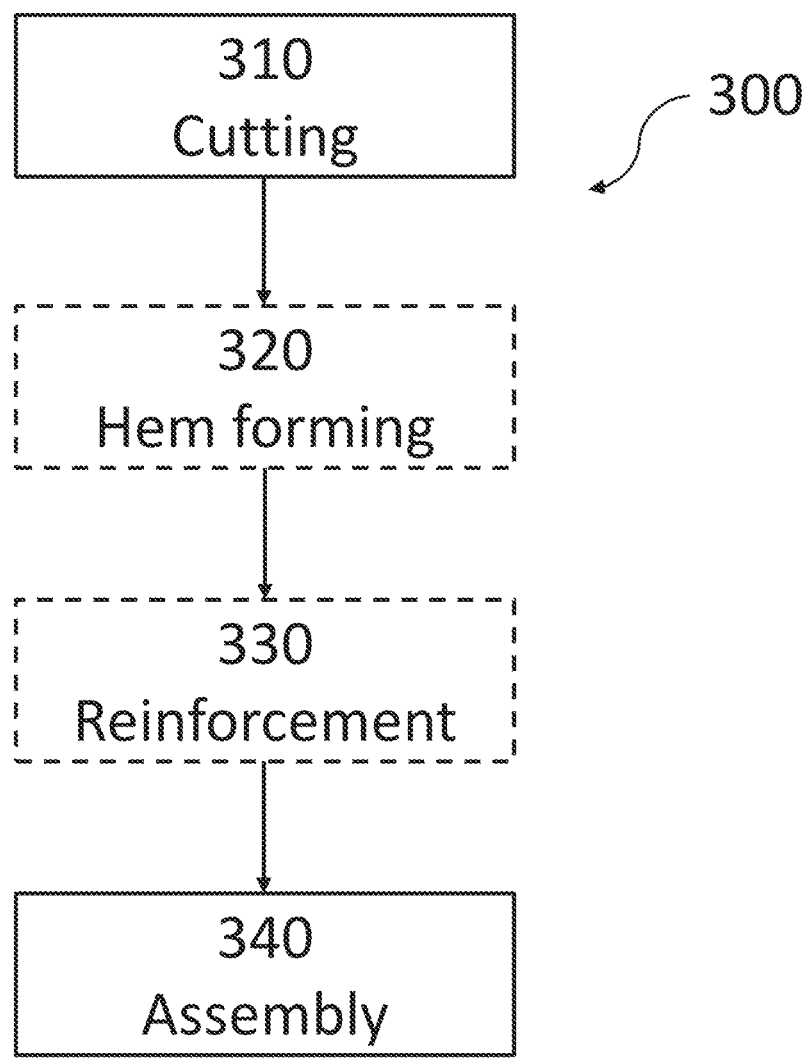
FIG. 7 is a flowchart of a method for manufacturing a lining element.

The reinforcement step 330 is represented subsequent to step 320 of forming a hem in FIG. 7, nonetheless these steps can also be indifferently reversed.

During an assembly step 340, the cut pieces 110a, 110b and 110c are secured together, preferably by sewing. The assembly is performed at the longitudinal boundaries of the cut pieces 110a, 110b and 110c, which are bound to one another.

Of course, the manufacturing method 300 can be generalized to any other number of cut pieces.

Figure 8:
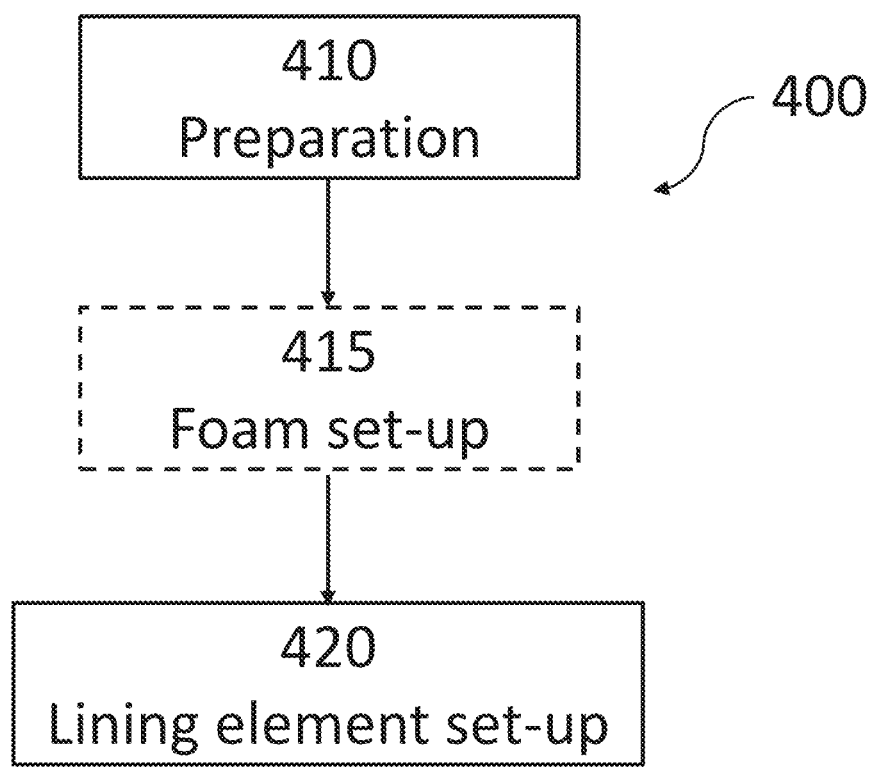
FIG. 8 is a flowchart of a method for setting up a lining element over an edge of an aeronautical seat.

Moreover, a method 400 for setting up a lining element 100 over an aeronautical seat shell 200 is also described hereinafter, illustrated by the flowchart of FIG. 8.

During a preparation step 410, a bonding means is applied over the boundaries contiguous to the edge 210 of the shell 200. According to one variant, a double-sided adhesive tape is placed over the boundaries contiguous to the edge 210, whereas according to another variant, a masking adhesive tape is placed over the boundaries contiguous to the edge 210, so as to enable a proper application of a glue bead 112 over said contiguous boundaries.

Optionally, during a step 415 of setting up a foam, the foam 113 is set up over the edge 210. Preferably, the foam is set up using a holding tool in which foam sections are placed, and by which a substantially uniform pressure can be applied. In this manner, an even set-up of the foam 113 can be ensured.

During a set-up step 420, the lining element 100 is set up over the edge 210 (covered with foam 113 or not). Preferably, the lining element 100 is set up starting from a substantially curved portion of the edge 210. During the set-up step 420, in particular the lateral cut pieces 110a and 110c are smoothed on the boundaries contiguous to the edge 210, so as to obtain an aesthetically-pleasant transition between a cut piece and the shell 200. Preferably, the lining element 100 is held in position by a suitable tool (by clamping, under a weight, etc.) until the glue 112 cures.

What is claimed is:

1. An aeronautical seat shell lining element that is flexible for lining an edge of an aeronautical seat shell, characterized in that it is made up of an assembly of at least two elongate, flexible and planar cut pieces, secured together by respective longitudinal boundaries abutting against each other, wherein the assembly is configured to have a three-dimensional shape matching with an edge of an aeronautical seat shell so as to effect lining of the aeronautical seat shell, wherein the aeronautical seat shell lining element comprises three cut pieces, the aeronautical seat shell lining element having a substantially U-like shaped cross-section.

2. The aeronautical seat shell lining element according to claim 1, said three-dimensional shape corresponding to the shape generated by the translation of a cross-section of the aeronautical seat shell lining element along an open path of the three-dimensional space, said open path corresponding to the path covered by an edge of an aeronautical seat shell.

3. The aeronautical seat shell lining element according to claim 1, wherein said cut pieces are secured together by sewing, welding, or gluing.

4. The aeronautical seat shell lining element according to claim 1, wherein the cut pieces are made up of a lamination of several planar flexible materials.

5. The aeronautical seat shell lining element according to claim 1, wherein the cut pieces comprise a woven material, and/or leather, and/or leatherette.

6. The aeronautical seat shell lining element according to claim 1, wherein at least one cut piece comprises an elongate reinforcement fastened on an inner surface of said cut piece.

7. An aeronautical seat shell comprising the aeronautical seat shell lining element according to claim 1, said aeronautical seat shell lining element being fastened over an edge of the aeronautical seat shell.

* * * * *